United States Patent
Qin et al.

(10) Patent No.: US 11,969,829 B2
(45) Date of Patent: Apr. 30, 2024

(54) WELDING DEVICES AND WELDING, INSTALLATION AND DEBUGGING METHODS THEREOF

(71) Applicant: QUICK INTELLIGENT EQUIPMENT CO., LTD., Jiangsu (CN)

(72) Inventors: Fuke Qin, Changzhou (CN); Qin Pan, Changzhou (CN)

(73) Assignee: QUICK INTELLIGENT EQUIPMENT CO., LTD., Changzhou (CN)

(*) Notice: Subject to any disclaimer, the term of this patent is extended or adjusted under 35 U.S.C. 154(b) by 0 days.

(21) Appl. No.: 18/466,024

(22) Filed: Sep. 13, 2023

(65) Prior Publication Data

US 2023/0415254 A1    Dec. 28, 2023

Related U.S. Application Data

(63) Continuation-in-part of application No. PCT/CN2022/100003, filed on Jun. 21, 2022.

(30) Foreign Application Priority Data

Jan. 24, 2022   (CN) .......................... 202210078440.3

(51) Int. Cl.
     *B23K 3/00*         (2006.01)
     *B23K 3/06*         (2006.01)
     *B23K 31/02*       (2006.01)

(52) U.S. Cl.
     CPC .............. *B23K 3/0638* (2013.01); *B23K 3/06* (2013.01); *B23K 31/02* (2013.01)

(58) Field of Classification Search
CPC ........ B23K 1/00–206; B23K 3/00–087; B23K 3/0638; B23K 31/02; B23K 9/00–328
See application file for complete search history.

(56) References Cited

U.S. PATENT DOCUMENTS 4,899,924 A * 2/1990 Kawaguchi .......... B23K 1/0056
                                            219/121.64
5,297,718 A     3/1994 Nagata
(Continued)

FOREIGN PATENT DOCUMENTS

CN       201586812 U     9/2010
CN       101618481 B *   6/2012 ........... B23K 1/0016
(Continued)

OTHER PUBLICATIONS

"Welding Droplet Transfer in Arc Welding, Explained in Detail!", Web page <https://www.sohu.com/a/349905876_752945>, Oct. 27, 2019, 11 pages.
(Continued)

*Primary Examiner* — Kiley S Stoner
(74) *Attorney, Agent, or Firm* — Porus IP LLC (57) ABSTRACT

The embodiment of the present disclosure provides a welding device, a welding method, and an installation and debugging method thereof. The welding device includes a baseboard, comprising: a left welding nozzle and a right welding nozzle, a power shaft, a bidirectional moving wheel, and two welding nozzle connecting shafts, wherein the welding nozzle connecting shafts are connected to the left welding nozzle and the right welding nozzle respectively, and the bidirectional moving wheel which is driven by the power shaft drives the two welding nozzle connecting shafts to move towards or away from each other.

12 Claims, 9 Drawing Sheets

(56) References Cited

U.S. PATENT DOCUMENTS

| | | | | |
|---|---|---|---|---|
| 5,364,011 A | * | 11/1994 | Baker | B23K 3/0623 228/33 |
| 5,894,980 A | * | 4/1999 | Orme-Marmarelis | B23K 3/0623 222/592 |
| 6,015,083 A | * | 1/2000 | Hayes | H01L 24/13 228/256 |

FOREIGN PATENT DOCUMENTS

| | | | | |
|---|---|---|---|---|
| CN | 104249204 A | * | 12/2014 | B23K 3/00 |
| CN | 104607791 A | | 5/2015 | |
| CN | 107159995 A | | 9/2017 | |
| CN | 111069758 A | | 4/2020 | |
| CN | 212043104 U | | 12/2020 | |
| CN | 112548258 A | * | 3/2021 | B23K 3/00 |
| CN | 114083098 A | * | 2/2022 | |
| CN | 114083098 A | | 2/2022 | |
| CN | 114083191 A | * | 2/2022 | |
| CN | 114083191 A | | 2/2022 | |
| CN | 114951884 A | * | 8/2022 | |
| EP | 0574218 B1 | | 1/1997 | |
| JP | 2018183803 A | | 11/2018 | |

OTHER PUBLICATIONS

"Possible Welding Defects Caused by Fusion Welding Joints", Web page <https://zhuanlan.zhihu.com/p/297590155>, Nov. 17, 2020, 2 pages.
International Search Report in PCT/CN2022/100003 dated Oct. 27, 2022, 6 pages.
First Office Action in Chinese Application No. 202210078440.3 dated Mar. 7, 2022, 13 pages.
The Second Office Action in Chinese Application No. 202210078440.3 dated Mar. 25, 2022, 7 pages.
Decision to grant a patent in Chinese Application No. 202210078440.3 dated Apr. 8, 2022, 3 pages.

* cited by examiner

WELDING DEVICES AND WELDING, INSTALLATION AND DEBUGGING METHODS THEREOF

CROSS-REFERENCE TO RELATED APPLICATIONS

This application is a continuation-in-part of International Patent Application No. PCT/CN2022/100003 filed on Jun. 21, 2022, which claims priority of Chinese Patent Application No. 202210078440.3, filed on Jan. 24, 2022, the entire contents of which are incorporated herein by reference.

TECHNICAL FIELD

The present disclosure relates to the technical field of welding with a melted drop, and in particular, to a welding device and welding, an installation and debugging method thereof.

BACKGROUND

At present, when using an opening-closing welding nozzle with a melted drop to weld a product, two welding nozzles are usually completely closed as a benchmark. Two welding nozzles of a same resistance welding head are divided into a left welding nozzle and a right welding nozzle. No matter which welding nozzle deviates, when the welding nozzle opens and closes to weld the product, the welding may deviate to hit the product, resulting in a defective welding product. In addition, such process may increase a commissioning cycle and make installation and maintenance inconvenient.

Therefore, there is a need for a welding device and welding method, an installation and debugging method thereof, which can improve an opening and closing action and a selection benchmark of the welding nozzles with a melted drop, and optimize a related structure of the welding device.

SUMMARY

One of the embodiments of the present disclosure provides a welding device, comprising: a baseboard, on which a left welding nozzle and a right welding nozzle are disposed respectively, a power shaft, a bidirectional moving wheel, and two welding nozzle connecting shafts, wherein the welding nozzle connecting shafts are connected to the left welding nozzle and the right welding nozzle respectively, and the bidirectional moving wheel which is driven by the power shaft drives the two welding nozzle connecting shafts to move towards or away from each other; the power shaft is rotatably connected to the baseboard; the bidirectional moving wheel is fixed on the power shaft, and the bidirectional moving wheel includes two hooking portions, and the two hooking portions are centered on the power shaft in a centrosymmetric structure, the bidirectional moving wheel rotates under an action of the power shaft, and the welding nozzle connecting shafts are disposed inside the two hooking portions respectively, and the at least one welding nozzle connecting shaft performs a backward separation movement or a mutually approaching movement driven by the hooking portions when the bidirectional moving wheel rotates; when the bidirectional moving wheel rotates, the each welding nozzle connecting shaft moves along an inner side edge of the corresponding hooking portion and slides to an outer side edge of the corresponding hooking portion, and then enters and moves along an inner side of another hook, that is, the left welding nozzle and the right welding nozzle perform a linear reciprocating action driven by the hooking portions through the welding nozzle connecting shafts.

One of the embodiments of the present disclosure provides a welding method for the welding device, including: transmitting a solder between a left welding nozzle and a right welding nozzle for heating and melting, after the solder is fully melted, making the two welding nozzle connecting shafts be driven to move towards or away from each other by the bidirectional moving wheel which is driven by the power shaft, making the left welding nozzle and the right welding nozzle open and close several times, and a melted solder falls between the left welding nozzle and the right welding nozzle to weld a product to be welded.

One of the embodiments of the present disclosure provides a method for installing and debugging a welding device, including: a. taking a connection line H formed by an installation positioning hole as a debugging benchmark, and installing a sensing photoelectric element on the connection line H, so that a sensing center of the sensing photoelectric element coincides with the connection line H; b. installing a welding nozzle sensing film relative to the power shaft, and fixing a bidirectional moving wheel on a power shaft correspondingly; and c. rotating the welding nozzle sensing film until it contacts a signal of the sensing photoelectric element, recording an original point by the sensing photoelectric element, and setting an opening-closing distance between a left welding nozzle and a right welding nozzle by using the original point as a benchmark point.

BRIEF DESCRIPTION OF THE DRAWINGS

The present disclosure will be further illustrated by way of exemplary embodiments, which will be described in detail with the accompanying drawings. These embodiments are non-limiting, and in these embodiments, the same number indicates the same structure, wherein.

DETAILED DESCRIPTION

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art may also apply the present disclosure to other similar scenarios. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, parts, or assemblies of different levels. However, the words may be replaced by other expressions if other words can achieve the same purpose.

As indicated in the present disclosure and claims, the terms "a", "an", "one" and/or "the" are not specific to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

Figure 1:
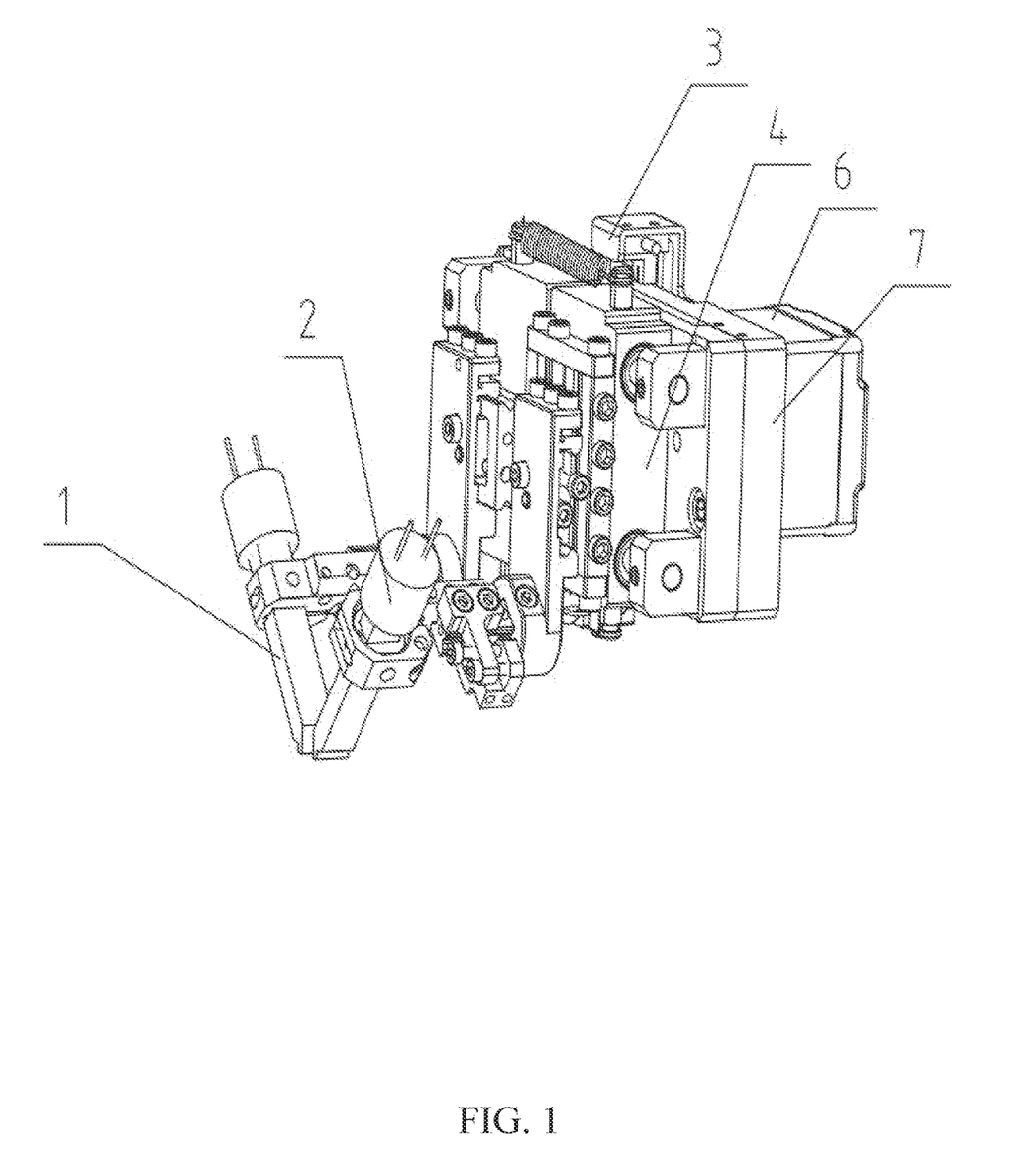
FIG. 1 is a schematic diagram illustrating an exemplary three-dimensional structure of a welding device according to some embodiments of the present disclosure.
Figure 2:
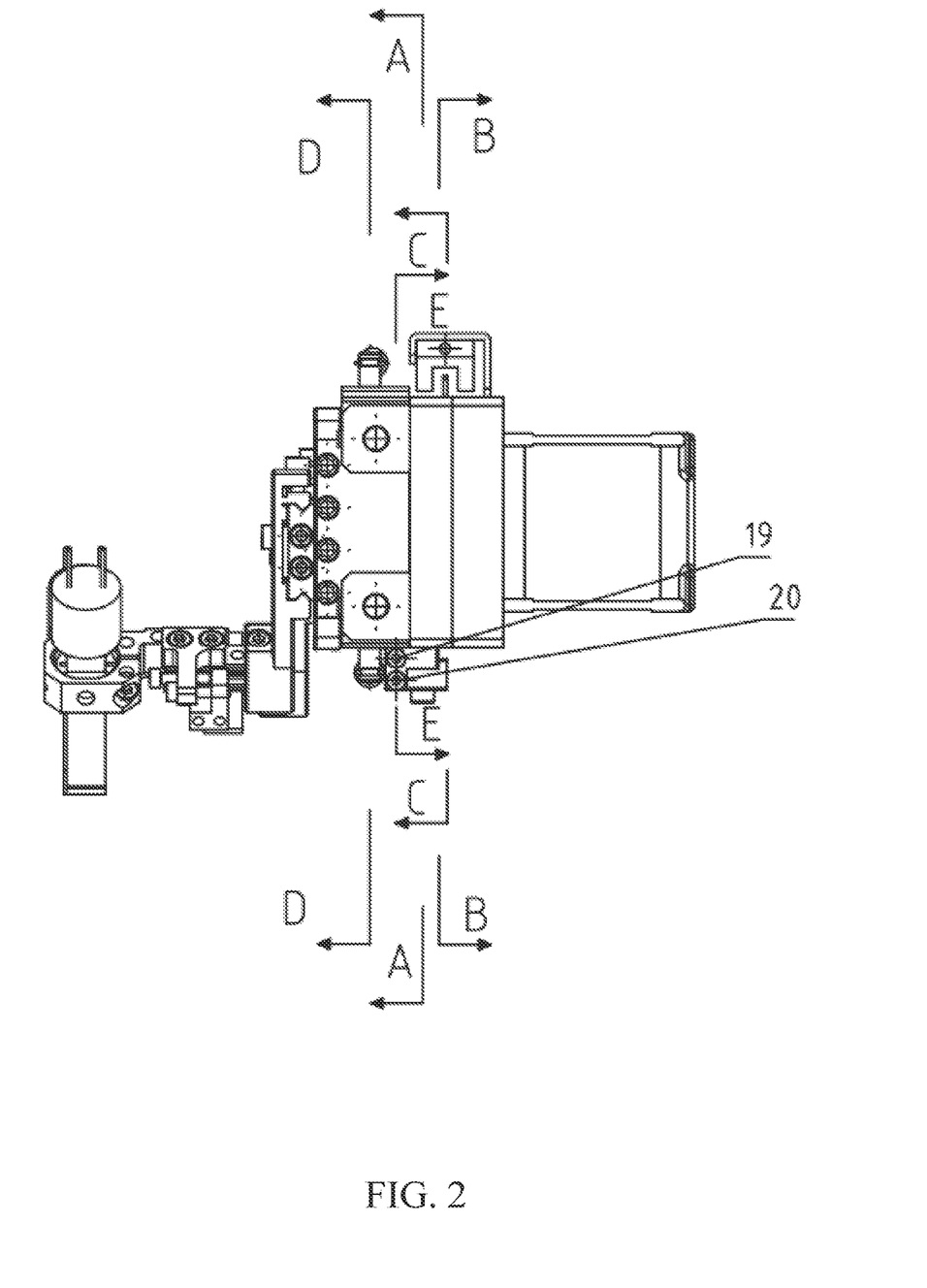
FIG. 2 is a structural diagram illustrating an exemplary side view of the welding device according to some embodiments of the present disclosure.

FIG. 1 is a schematic diagram illustrating an exemplary three-dimensional structure of a welding device according to some embodiments of the present disclosure. FIG. 2 is a structural diagram illustrating an exemplary side view of the welding device according to some embodiments of the present disclosure;

In some embodiments, as shown in FIG. 1 and FIG. 2 as well as the following figures (such as FIGS. 3-FIG. 6), the welding device includes a baseboard 7 for supporting and installing components of the device. In some embodiments, a left welding nozzle 1 and a right welding nozzle 2 are respectively disposed on the baseboard 7. In some embodiments, the welding device further includes a power shaft 9, a bidirectional moving wheel 11, and two welding nozzle connecting shafts 8. The welding nozzle connecting shafts 8 are rotatably connected with the left welding nozzle 1 and the right welding nozzle 2 correspondingly, the baseboard 7 is rotatably connected with the power shaft 9, and the welding nozzle connecting shafts 8 move towards or away from each other driven by the bidirectional moving wheel 11 which is driven by the power shaft 9.

In some embodiments, an opening-closing motor 6 that drives the power shaft 9 to rotate is fixed on a rear end of the baseboard 7, so as to provide power for opening and closing of the welding nozzles. In some embodiments, a positioning wheel 15, a welding nozzle sensing film 16, and the bidirectional moving wheel 11 may be fixed on the power shaft 9 in sequence.

In some embodiments, the welding device includes a left opening-closing plate 5 and a right opening-closing plate 4, the left welding nozzle 1 is disposed on the left opening-closing plate 5, and the right welding nozzle 2 is disposed on the right opening-closing plate 4.

In some embodiments, an optical shaft 13 is disposed on the baseboard 7. In some embodiments, a count of optical shafts 13 may be two, and the two optical shafts 13 may be arranged in parallel up and down. In some embodiments, the left opening-closing plate 5 may be slidably connected to the two optical shafts 13, the right opening-closing plate 4 may be symmetrical to the left opening-closing plate 5, and the right opening-closing plate 4 may also be slidably connected to the two optical shafts 13 synchronously. Therefore, the left welding nozzle 1 and the right welding nozzle 2 may be slidably connected to the optical shaft 13 through the left opening-closing plate 5 and the right opening-closing plate 4 respectively.

In some embodiments, the left opening-closing plate 5 and the right opening-closing plate 4 are rotatably connected to the welding nozzle connecting shafts 8 respectively. In some embodiments, the left welding nozzle 1 and the right welding nozzle 2 may reciprocate in a straight line along the optical shaft 13 driven by the bidirectional moving wheel 11 through the welding nozzle connecting shafts 8.

Figure 3:
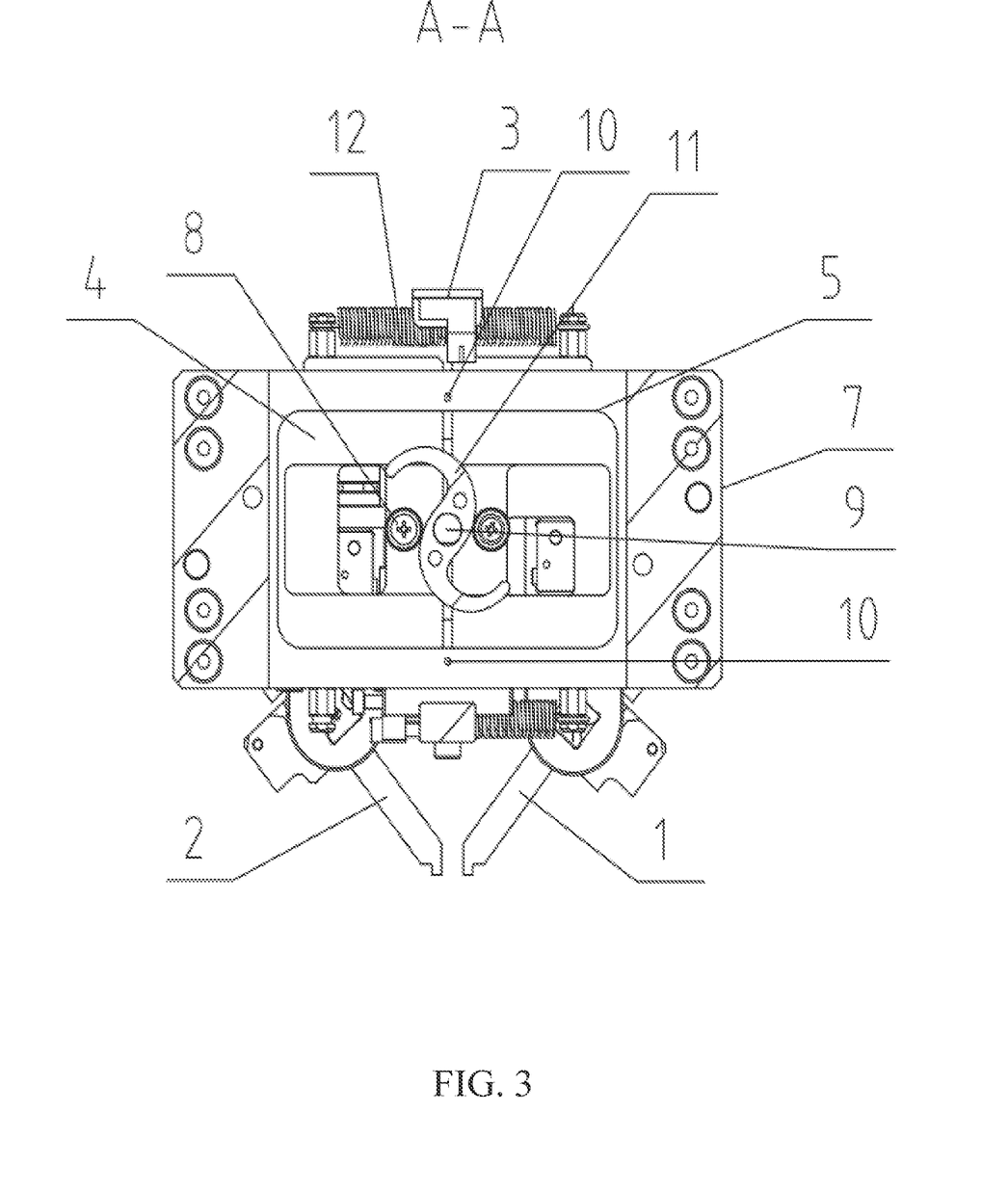
FIG. 3 is a structural diagram illustrating an exemplary cross-section along a direction of A to A shown in FIG. 2 according to some embodiments of the present disclosure.
Figure 4:
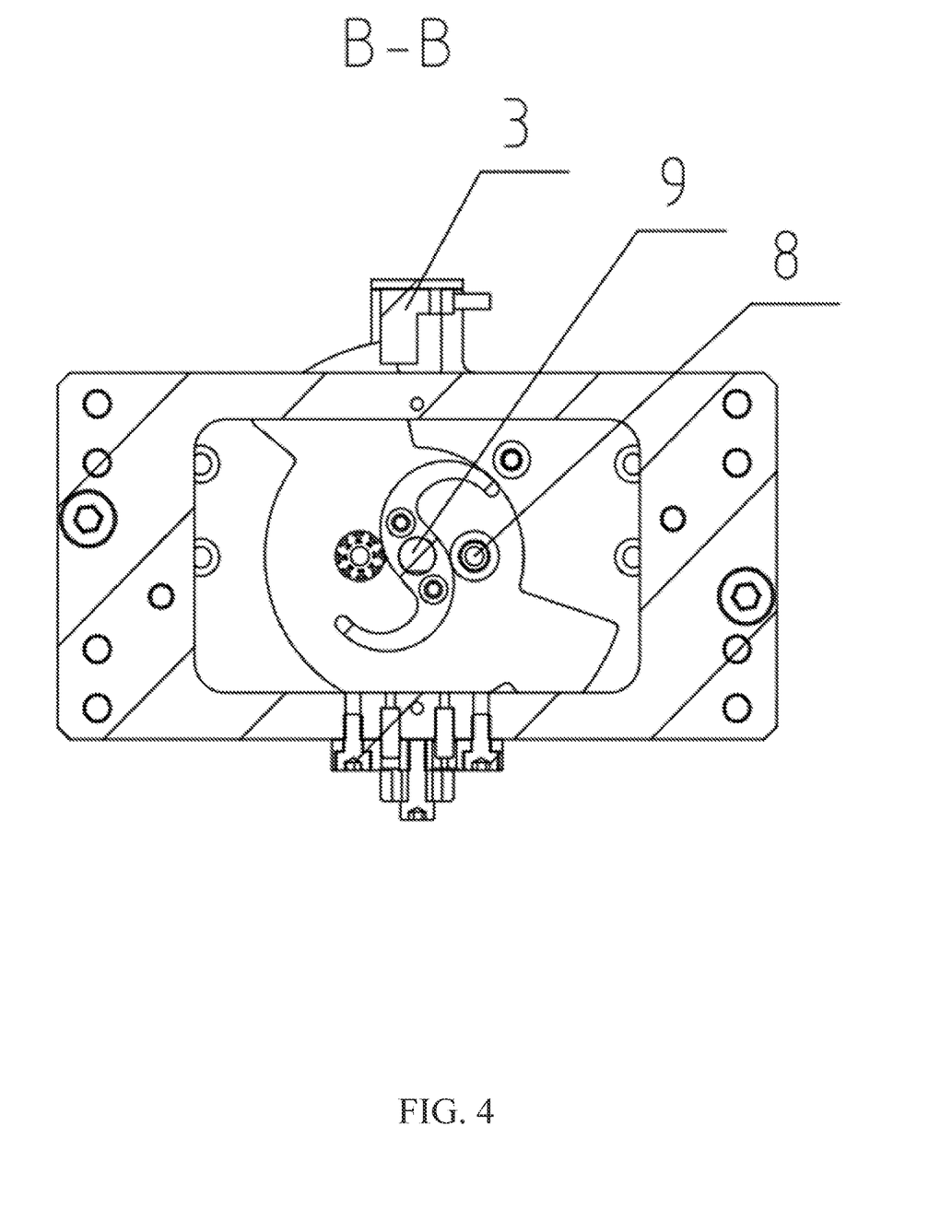
FIG. 4 is a structural diagram illustrating an exemplary cross-section along a direction of B to B shown in FIG. 2 according to some embodiments of the present disclosure.

FIG. 3 is a schematic diagram illustrating an exemplary cross-section structure along a direction of A to A shown in FIG. 2 according to some embodiments of the present disclosure. FIG. 4 is a schematic diagram illustrating an exemplary cross-section structure along a direction of B to B shown in FIG. 2 according to some embodiments of the present disclosure.

In some embodiments, as shown in FIG. 3 and FIG. 4, a radial section of the bidirectional moving wheel 11 is S-shaped, and the welding nozzle connecting shafts 8 may be disposed on both sides of the S-shape separately. In some embodiments, the bidirectional moving wheel 11 may include two hooking portions, and the two hooking portions may be centrosymmetric with the power shaft 9 at the center. In some embodiments, the bidirectional moving wheel 11 with an S-shaped radial cross-section is a centrally symmetrical structure. Two sides of the S-shape of the bidirectional moving wheel 11 correspond to the hooking portions, wherein an inner side of each hooking portion corresponds to an inner circumference of the S-shape, while an outer side of each hooking portion corresponds to an outer circumference of the S-shape.

In some embodiments, when the bidirectional moving wheel 11 rotates under an action of the power shaft 9, at least one welding nozzle connecting shaft 8 is driven by the hooking portion(s) to perform a backward separation movement or a mutually approaching movement. In some embodiments, when the bidirectional moving wheel 11 rotates, the each welding nozzle connecting shaft 8 moves along an inner side edge of the corresponding hooking portion and slides to an outer side edge of the hooking portion, and then moves into an inner side of the other hooking portion. That is, the left welding nozzle 1 and the right welding nozzle 2 reciprocate in a straight line under an action of the hooking portions through the welding nozzle connecting shafts 8. In some embodiments, the welding nozzle connecting shafts 8 are disposed on the hooking portions on each side of the bidirectional moving wheel 11 respectively, and when the bidirectional moving wheel 11 rotates, the welding nozzle connecting shafts 8 are separated and pushed away to realize an opening of the welding nozzles. In some embodiments, each welding nozzle connecting shaft 8 is pushed by the inner inside of the corresponding hooking portion to move to an extreme point (points at a starting position and an ending position of the S-shape), and then cross the extreme point to enter the inner side of the other hooking portion, and moves with a rotation of the bidirectional moving wheel 11 so on and so forth, forming a motion track of the each welding nozzle connecting shaft 8. Due to the restriction of the optical shaft 13, the motion track of each welding nozzle connecting shaft 8 is a linear motion parallel to the optical shaft 13.

Figure 6:
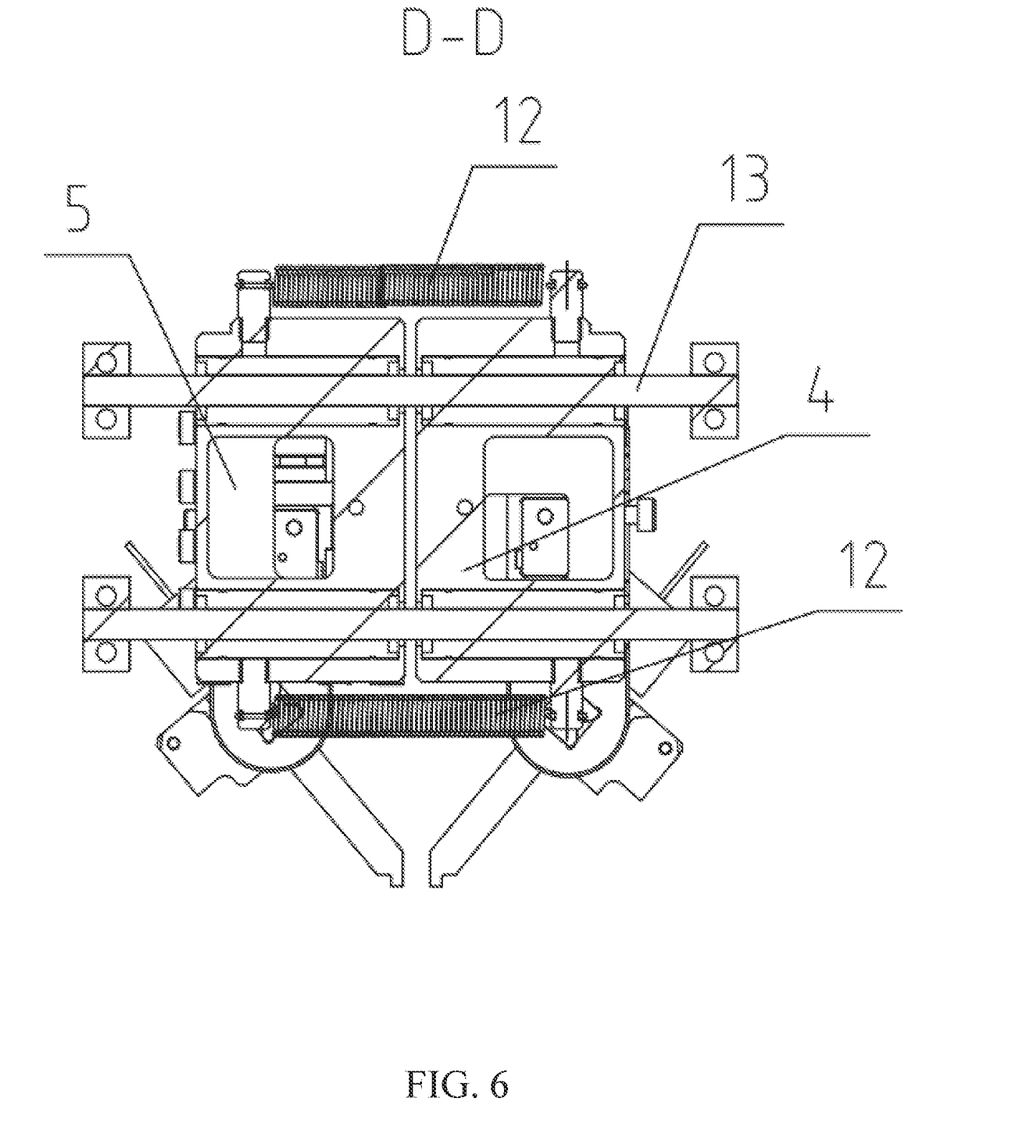
FIG. 6 is a structural diagram illustrating an exemplary cross-section along a direction of D to D shown in FIG. 2 according to some embodiments of the present disclosure.
Figure 7:
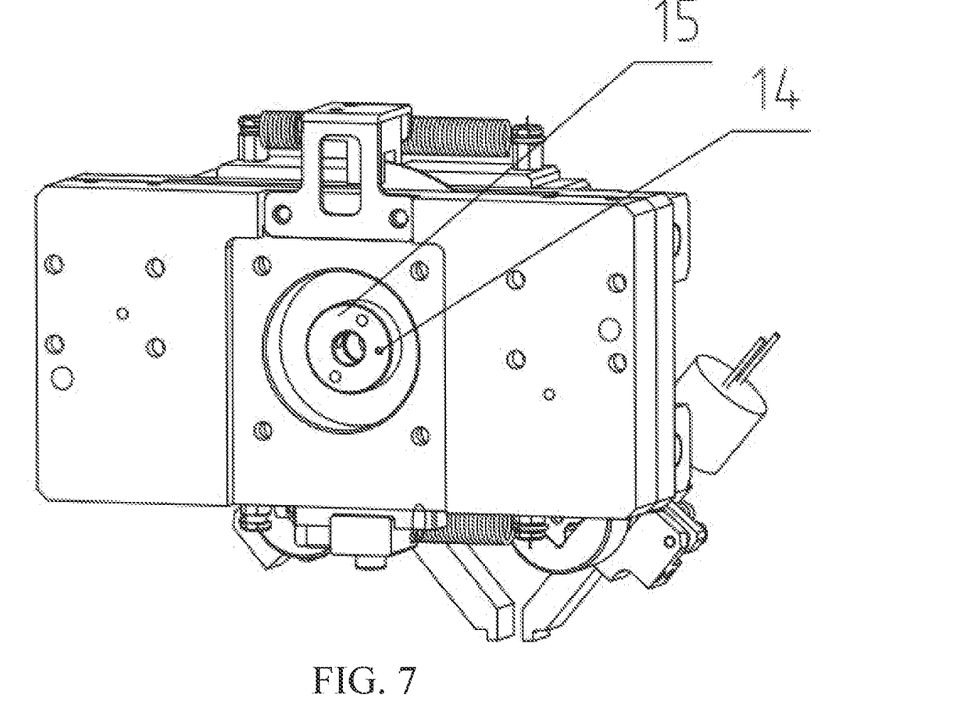
FIG. 7 is a structural diagram illustrating a rear view of a baseboard when an opening-closing motor and a power shaft are not installed according to some embodiments of the present disclosure.

FIG. 6 is a schematic diagram illustrating an exemplary cross-section structure along a direction of D to D shown in FIG. 2 according to some embodiments of the present disclosure.

In some embodiments, as shown in FIG. 3 and FIG. 6, a tension spring 12 is elastically disposed between the left opening-closing plate 5 and the right opening-closing plate 4, and a stretching direction of the tension spring 12 is axially parallel to the optical shaft 13. After the bidirectional moving wheel 11 rotates and separates the welding nozzle connecting shafts 8 to a maximum point, the tension spring 12 acts to reset and close the opening-closing plates on both sides, driving the welding nozzle connecting shafts 8 to move towards each other, which can effectively realize an automatic closing of the welding nozzle.

Figure 5:
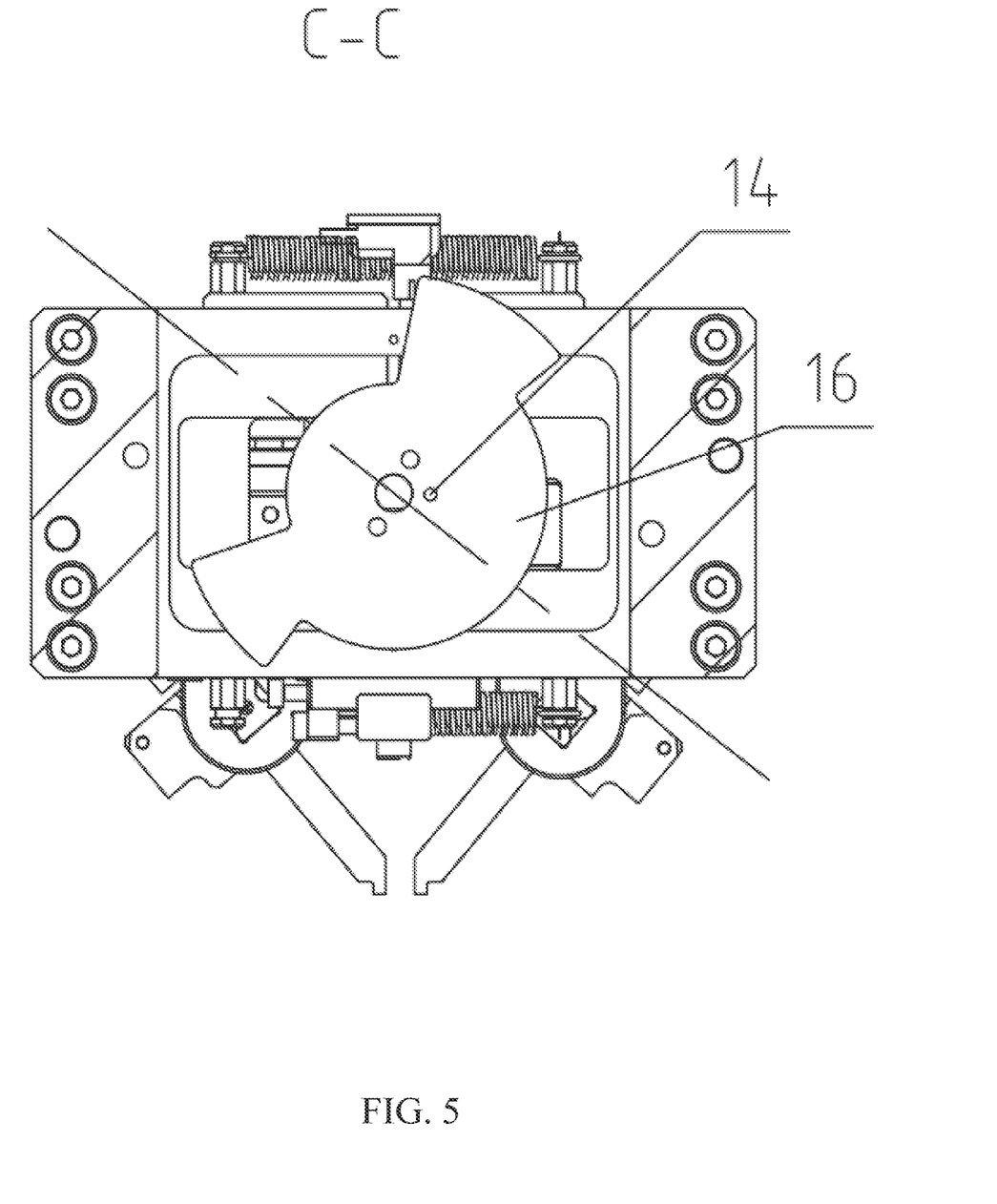
FIG. 5 is a structural diagram illustrating an exemplary cross-section along a direction of C to C shown in FIG. 2 according to some embodiments of the present disclosure.

In some embodiments, the welding nozzle sensing film 16 is fixed on the power shaft 9. A sensing pin is disposed on the welding nozzle sensing film 16 and the welding nozzle sensing film 16 is fixed with the bidirectional moving wheel 11 by the sensing pin, and the welding nozzle sensing film 16 moves synchronously with the bidirectional moving wheel 11. In some embodiments, a pin positioning hole 14 is on the welding nozzle sensing film 16, the sensing pin is inserted into the pin positioning hole 14, and the sensing pin is disposed eccentrically relative to the power shaft 9. In some embodiments, a positioning wheel 15 is disposed on the power shaft 9. The positioning wheel 15 has a sensing hole, and the sensing pin is plugged into the sensing hole and the pin positioning hole 14. Through a positioning of the sensing pin, a synchronous rotation of the welding nozzle sensing film 16 and the bidirectional moving wheel 11 is realized, and a synchronous rotation of the positioning wheel 15, the welding nozzle sensing film 16, and the bidirectional moving wheel 11 is realized finally. In some embodiments, the positioning wheel 15 may be fixedly connected to the hooking portions of the bidirectional moving wheel 11 respectively.

Figure 8:
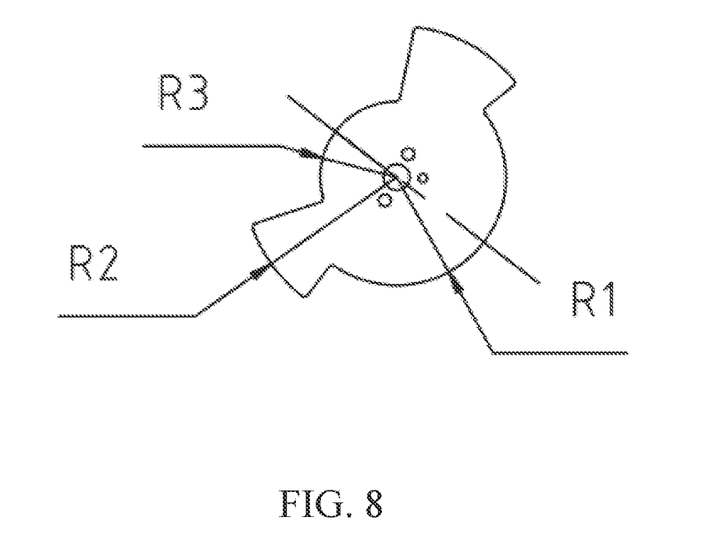
FIG. 8 is a structural diagram illustrating an exemplary welding nozzle sensing film according to some embodiments of the present disclosure.

FIG. 8 is a schematic diagram illustrating an exemplary welding nozzle sensing film according to some embodiments of the present disclosure.

In some embodiments, as shown in FIG. 5 and FIG. 8, the welding nozzle sensing film 16 may be in a disc-shaped structure. The disc-shaped structure may include two sheet-shaped bodies in a one-piece structure and radially symmetrical. Each sheet-shaped body may include three fan-shaped bodies connected in sequence. The three fan-shaped bodies are disposed concentrically with diameters of R1, R2, and R3 in sequence, wherein R3<R1<R2. In some embodiments, a radius of a rotation track at an outermost end of each hooking portion of the bidirectional moving wheel 11 is R4, wherein R4=R3, and a sensing photoelectric element 3 is disposed on a motion track of a fan-shaped body with a diameter of R3. The sensing photoelectric element 3 for detecting the welding nozzle sensing film 16 is disposed on the baseboard 7. The sensing photoelectric element 3 is disposed on the motion track of the fan-shaped body with a diameter of R3, and senses a photoelectric signal of the fan-shaped body.

Figure 9:
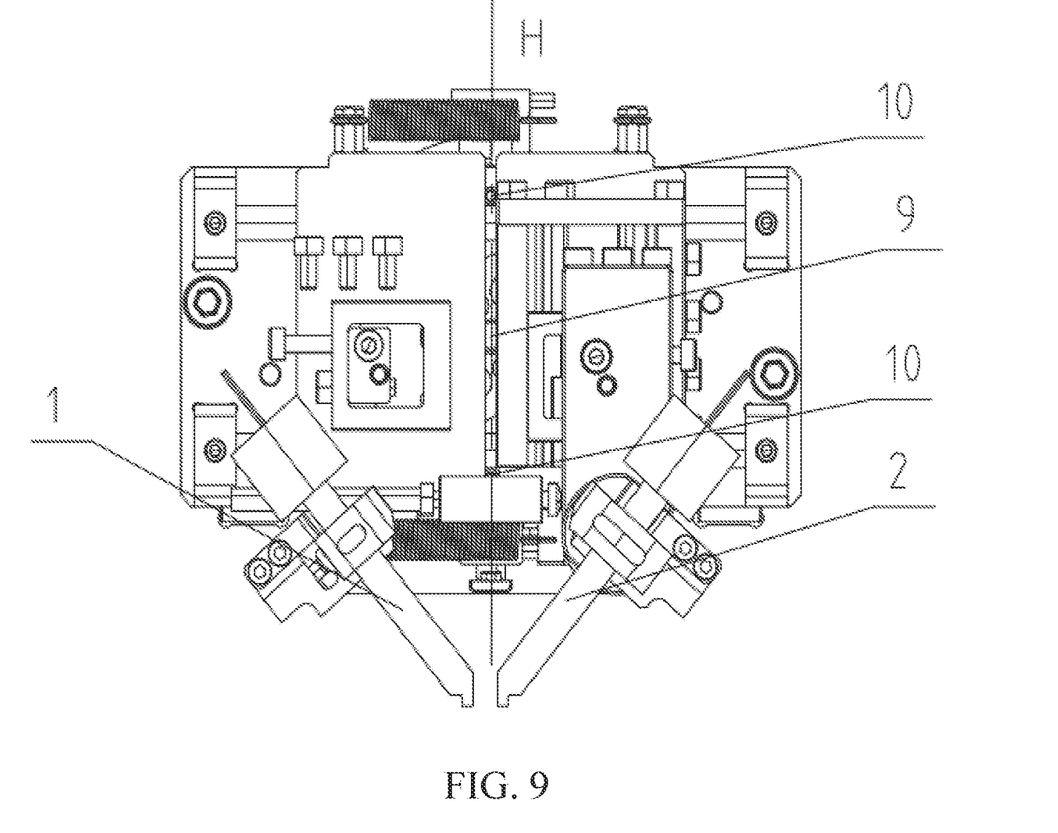
FIG. 9 is a front structural diagram illustrating an exemplary welding device according to some embodiments of the present disclosure.

FIG. 9 is a front structural diagram illustrating an exemplary welding device according to some embodiments of the present disclosure.

In some embodiments, as shown in FIG. 9, installation positioning holes are disposed on the baseboard 7 corresponding to an upper and lower sides of the power shaft 9, and a positioning piece 10 is fixed inside the installation positioning holes. In some embodiments, the positioning piece 10 may be inserted between the left opening-closing plate 5 and the right opening-closing plate 4, the positioning piece 10 may be a positioning screw, and the positioning screw is inserted between the left opening-closing plate 5 and the right opening-closing plate 4.

In some embodiments, the power shaft 9 is located on a connection line H formed by the positioning piece 10, and the left welding nozzle 1 and the right welding nozzle 2 are disposed on two sides of the connection line H respectively. In some embodiments, the sensing photoelectric element 3 is also disposed on the connection line H. In some embodiments, the connection line H may be used as a baseline for installation and debugging.

In some embodiments, a single-double action fine-tuning mechanism is disposed on the baseboard 7, and a synchronous opening and closing movement of the left welding nozzle 1 and the right welding nozzle 2 may be realized through a rotation of the bidirectional moving wheel 11. At the same time, under the control of the single-double action fine-tuning mechanism, the welding nozzle on one side may be pushed away (do not move after being pushed away, or partially reciprocate after being partially pushed away), while the welding nozzle on the other side may be open and closed normally (welding nozzle on a single side opens and closes).

Figure 10:
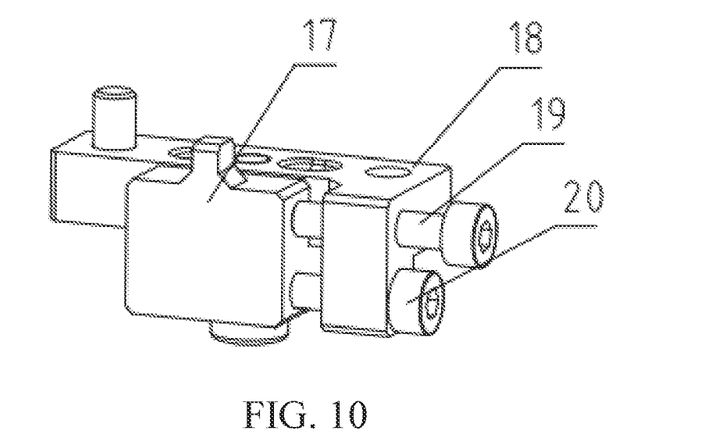
FIG. 10 is a schematic diagram illustrating an exemplary three-dimensional structure of a single-double action fine-tuning mechanism according to some embodiments of the present disclosure.
Figure 11:
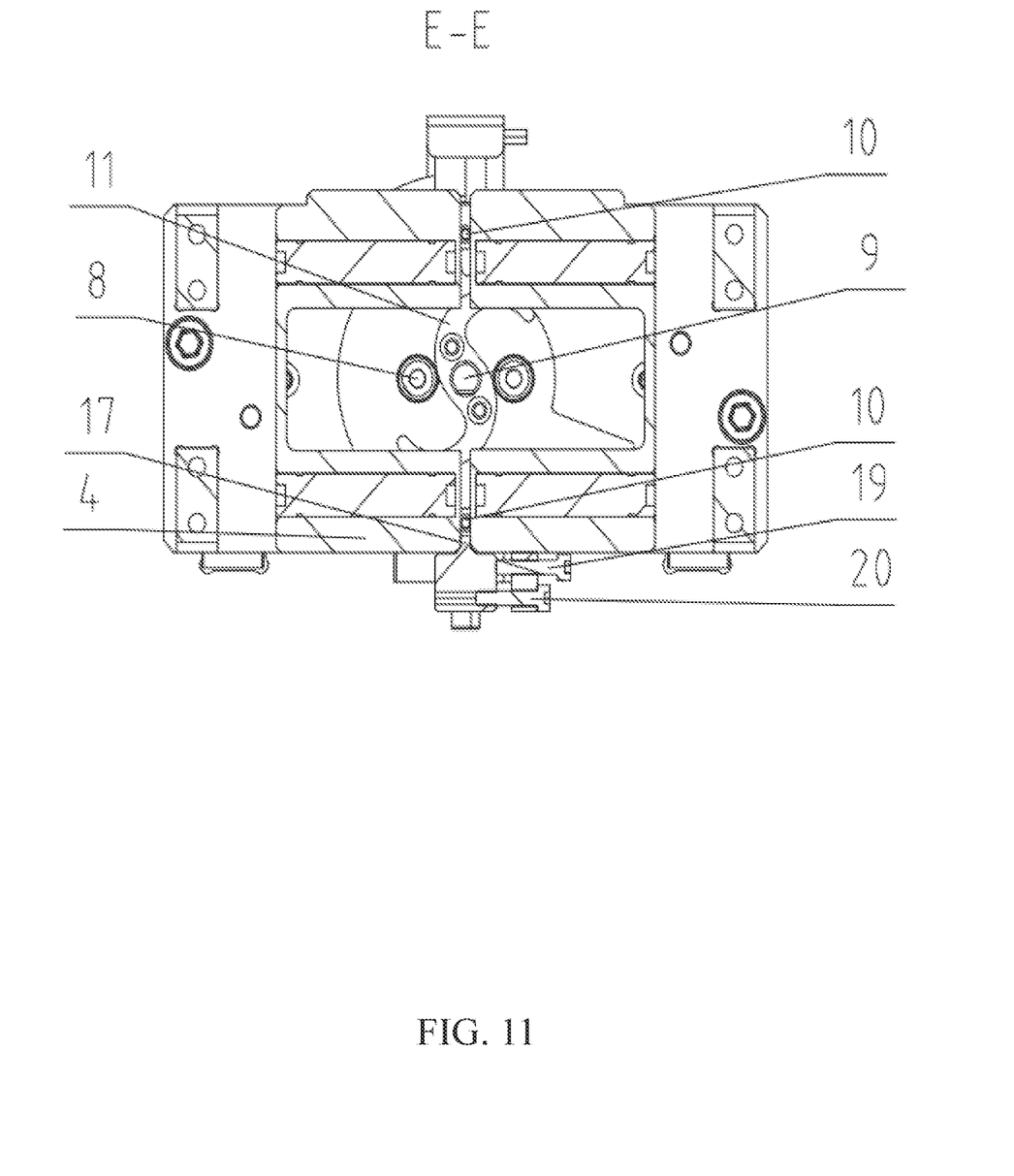
FIG. 11 is a structural diagram illustrating an exemplary cross-section along a direction of E to E shown in FIG. 2 according to some embodiments of the present disclosure.

FIG. 10 is a schematic diagram illustrating an exemplary three-dimensional structure of a single-double action fine-tuning mechanism according to some embodiments of the present disclosure. FIG. 11 is a schematic diagram illustrating an exemplary cross-section structure along a direction of E to E shown in FIG. 2 according to some embodiments of the present disclosure.

In some embodiments, as shown in FIG. 10 and FIG. 11, the single-double action fine-tuning mechanism includes a location-limiting guide block 17, a single-double action location-limiting block 18, a single-double action location-limiting slide bar 19 and a single-double action location-limiting adjustment screw 20. In some embodiments, the location-limiting guide block 17 may be disposed between the left opening-closing block 4 and the right opening-closing block 5. The single-double action location-limiting slide bar 19 may be arranged axially parallel to the single-double action location-limiting adjustment screw 20, and the single-double action location-limiting block 18 may be fixed on the baseboard 7. One end of the single-double action location-limiting slide bar 19 may be fixed with the location-limiting guide block 17, and the other end may be slidably connected to the single-double action location-limiting block 18 along a horizontal direction. The single-double action location-limiting adjustment screw 20 is threadedly connected to the single-double action location-limiting block 18, and one end portion of the single-double action location-limiting adjustment screw 20 abuts against the location-limiting guide block 17. In some embodiments, by turning the single-double action location-limiting adjustment screw 20, the location-limiting guide block 17 is driven to adjust horizontally relative to the single-double action location-limiting block 18.

In some embodiments, when the location-limiting guide block moves along an axial direction of the single-double action location-limiting slide bar, it can drive the welding nozzle connecting shaft of the left welding nozzle or the welding nozzle connecting shaft of the right welding nozzle to move synchronously. For example, when the location-limiting guide block 17 moves to the left, it is crimped on a left opening-closing block 4 to drive the left opening-closing block 4 to move to the left, and when the location-limiting guide block 17 moves to the right, it is crimped on a right opening-closing block 5 to drive the right opening-closing block 5 moves to the right, thereby realizing an act of pushing away the left welding nozzle 1 solely or the welding nozzle 2 solely.

In some embodiments, when the location-limiting guide block 17 is disposed on the connection line H as a benchmark, that is, when an adjustment center line of the single-double action fine-tuning mechanism is disposed on the connection line H, the left welding nozzle 1 and the right welding nozzle 2 are disposed on both sides of the location-limiting guide block 17 respectively. The location-limiting guide block 17 may not have an effect on the two welding nozzle connecting shafts 8, and left welding nozzle 1 and right welding nozzle 2 perform a reciprocating opening and closing motion under a rotation of the bidirectional moving wheel 11.

In some embodiments, when the welding nozzle on one side is required to perform an opening and closing motion, the welding nozzle on one side pushed by the location-limiting guide block 17 may not be limited by the location-limiting guide block 17 and may be operated normally under the control of the bidirectional moving wheel 11. If it is necessary to adjust the welding nozzle on a side, it is adjusted and controlled by the single-double action fine-tuning mechanism.

In some embodiments, by turning the single-double action location-limiting adjustment screw 20 to push the location-limiting guide block 17 to a direction of a side where a welding nozzle that does not need to move is located, so that the location-limiting guide block 17 may push the welding nozzle connecting shaft 8 corresponding to the welding nozzle to move outwards. This pushing motion makes that there are two kinds of cooperation states between the welding nozzle connecting shaft 8 on this side and the bidirectional moving wheel 11, and a specific cooperation state is as follows:

1. When the welding nozzle connecting shaft 8 on this side is pushed outward, but a location where the welding nozzle connecting shaft 8 on this side is limited by the location-limiting guide block 17 is still within a motion range of the bidirectional moving wheel 11, the welding nozzle connecting shaft 8 on this side perform a partially reciprocating opening and closing motion between a maximum outer diameter of the bidirectional moving wheel 11 and the welding nozzle connecting shaft 8 corresponding to the location-limiting guide block 17 when the bidirectional moving wheel 11 rotates. The above operation realizes a process that the welding nozzle on one side performs a normally reciprocating opening and closing action, and the welding nozzle on the other side performs the partially reciprocating opening and closing action.
2. When the welding nozzle connecting shaft 8 on this side is pushed outward until the welding nozzle connecting shaft 8 on this side is not within the motion range of the bidirectional moving wheel 11, the rotation of the bidirectional moving wheel 11 may not affect and disrupt the welding nozzle connecting shaft 8 on this side. When the bidirectional moving wheel 11 rotates, the welding nozzle on one side performs the normally reciprocating opening and closing motion, and the welding nozzle on the other side was strutted, kept still, and did not act.

In some embodiments, a structural design of the welding device is reasonable. Through the design of the bidirectional moving wheel and the welding nozzle sensing film, the welding nozzle sensing film rotates to drive the left welding nozzle and the right welding nozzle to move outward synchronously; and under the action of the tension spring, the left welding nozzle and the right welding nozzle are driven to move inward synchronously, so as to realize a synchronous opening and closing of the left welding nozzle and the right welding nozzle. The welding device is convenient to disassemble and debug, and an opening and closing process is stable and accurate.

Some embodiments of the present disclosure provide a welding method for a device, wherein the method adopts the above-mentioned welding device, including the following steps.

A solder is transmitted between the left welding nozzle 1 and the right welding nozzle 2 for heating and melting. After being fully melted, the two welding nozzle connecting shafts 8 are driven to move towards or away from each other through the bidirectional moving wheel 11 which is driven by the power shaft 9, so that the left welding nozzle 1 and the right welding nozzle 2 are opened and closed several times, a melted solder falling between the left welding nozzle 1 and the right welding nozzle 2 is welded to obtain a product.

Some embodiments of the present disclosure provide a method for installing and debugging a welding device, wherein the method adopts the above-mentioned welding device, including the following debugging steps.

a. Taking a connection line H formed by an installation positioning hole as a debugging reference, and installing the sensing photoelectric element 3 on the connection line H, so that a sensing center of the sensing photoelectric element 3 coincides with the connection line H;
 b. Installing the welding nozzle sensing film 16 relative to the power shaft 9, and fixing the bidirectional moving wheel 11 to the power shaft 9 correspondingly;
 c. Rotating the welding nozzle sensing film 16 until it is contacted by a signal of the sensing photoelectric element 3, and recording an original point by the sensing photoelectric element 3, and setting an opening-closing distance between left and right welding nozzles by using the original point as a reference point.

In some embodiments, after a reference is determined by using the installation and debugging method, a reference point of the opening-closing distance of welding nozzle may be determined according to the signal of the sensing photoelectric element. This installation method is convenient and fast, and there is no need to adjust a location of the welding nozzle respectively, which can ensure that a center of the welding nozzle is opposite to a center of a product, and deflection is not easy to occur. At the same time, by using a same power shaft and the bidirectional moving wheel to drive an action of opening-closing plates on both sides synchronously, the welding nozzle has a good synchronization performance, and the welding nozzle is not easy to shift.

In some embodiments, the welding device further includes a processor (not shown in the figure), and the processor may determine a speed control parameter based on a welding parameter and a target droplet transfer form. In some embodiments, the processor may include a speed control module, and the speed control module may control a rotation speed of the opening-closing motor based on the speed control parameter, thereby controlling a moving speed of the left welding nozzle and the right welding nozzle.

The welding parameter refers to parameter data related to welding. For example, the welding parameter may include a welding current, an arc voltage, a welding speed, a welding wire (welding rod) diameter, a current polarity, and a length of welding wire sticking out, etc. The welding parameter may be pre-set and stored in the processor according to a welding requirement, and the welding parameter may also be manually input into the processor.

The target droplet transfer form refers to a target form of a droplet transferring to a molten pool. For example, the target droplet transfer form includes a short-circuit transfer, a droplet transfer, a jet transfer, or the like. A welding parameter of the short-circuit transfer includes a welding current of less than 200 A. A welding parameter of the droplet transfer includes a welding current of 200 to 300 A (100% $CO_2$) and an argon-rich gas mixture of 200 to 280 A. A welding parameter of the jet transfer includes an argon-rich gas and a welding current of 280 to 350 A. The target transfer form of droplet (also referred to as target droplet transfer form) may be preset and stored in the processor according to a process requirement, or may be manually input into the processor. In some embodiments, the target transfer form of droplet may be determined based on the welding parameter.

The speed control parameter refers to a parameter used to control the rotation speed of the opening-closing motor. In some embodiments, the processor may determine a speed control parameter of the opening-closing motor through a vector retrieval based on the welding parameter and the target transfer form of droplet. For example, the processor may construct a speed feature vector based on the welding parameter and the target transfer form of droplet. The processor may retrieve a speed vector database based on the speed feature vector, obtain a reference vector whose cosine distance from the speed feature vector satisfies a preset distance threshold, and determine a historical speed control parameter corresponding to the reference vector as a speed control parameter required currently. The speed vector database is used to store a plurality of historical speed vectors and historical speed control parameters corresponding to the plurality of historical speed vectors. The historical speed vectors are constructed based on historical welding parameters and historical target droplet transfer forms.

In some embodiments, the processor may also determine the speed control parameter through a speed determination model based on the welding parameter, the target transfer form of droplet, and a shielding gas composition. In some embodiments, the speed determination model may be a machine learning model, for example, the speed determination model may be a neural network model (NN) or the like. In some embodiments, an input of the speed determination model may include the welding parameter, the target transfer form of droplet, and the shielding gas composition; an output may include the speed control parameter.

In some embodiments, based on the speed control parameter output by the speed determination model, the speed control module controls the rotation speed of the opening-closing motor, thereby controlling the moving speed of the left welding nozzle and the right welding nozzle.

The shielding gas composition refers to a gas composition contained in a gas used to reduce a surface tension of a liquid metal. After a welding rod metal is melted, the liquid metal does not fall off immediately, but forms a ball droplet and hangs at an end of the welding rod under the action of the surface tension. As the welding rod continues to melt, a volume of the droplet continues to increase until a force acting on the droplet exceeds the tension between the droplet and a core interface, and the droplet breaks away from the core and transfers into the molten pool. Therefore, the surface tension is unfavorable for a droplet transfer during a flat welding. The transfer of the droplet hanging at the end of the electrode to the molten pool is facilitated by a shielding gas. The shielding gas composition includes oxidizing gases (e.g., $Ar$—$O_2$, $Ar$—$CO_2$).

In some embodiments, the shielding gas composition may be pre-selected according to a need of a welding process and manually input into the processor. The shielding gas composition may also be pre-set in the processor. For example, a certain device corresponds to a shielding gas with a certain composition selected, then the device may not replace it with another shielding gas composition.

In some embodiments, the input of the speed determination model further includes a movement pattern of welding nozzle. The movement pattern of welding nozzle may include pattern 1, pattern 2, and pattern 3. The pattern 1 is a symmetrical opening and closing of the left welding nozzle and the right welding nozzle. The pattern 2 is that the left welding nozzle or the right welding nozzle stays still after being pushed away, and a welding nozzle on the other side opens and closes normally. The pattern 3 is that the left welding nozzle or the right welding nozzle performs a partially reciprocating opening and closing after being pushed away partially, and the welding nozzle on the other side opens and closes normally.

In some embodiments, the movement pattern of welding nozzle may be obtained through various feasible ways, for example, through a manual input, or determined by the processor collecting information related to a movement of the left welding nozzle or the right welding nozzle.

For example, a displacement sensor may be disposed on the left welding nozzle or the right welding nozzle respectively, and the displacement sensor is communicatively connected with the processor. The processor may obtain displacement data collected by the displacement sensor to determine the movement of the left welding nozzle or the right welding nozzle, thereby determining the movement pattern of welding nozzle.

Exemplarily, the welding device may include a camera device. An image of the left welding nozzle or the right welding nozzle may be continuously collected by the camera device. The camera device may be communicatively connected with the processor. The processor obtains the image of the left welding nozzle or the right welding nozzle through the camera device, and extracts an image feature through image recognition technology to determine a movement situation of the left welding nozzle or the right welding nozzle, thereby determining the movement pattern of welding nozzle.

In some embodiments, the input of the speed determination model further includes a health score of the tension spring, which may be used to measure a degree of plastic deformation of the tension spring. In some embodiments, the health score of the tension spring may be expressed numerically. The tension spring is used to realize an automatic opening and closing of the left welding nozzle and the right welding nozzle. Under the action of a long-term or high temperature, the tension spring is prone to a plastic deformation, resulting in poor reset ability of the tension spring. In some embodiments, the lower the health score of the tension spring, the slower the closing of the welding nozzle. Therefore, the health score of the tension spring has an influence on the speed control module to control the moving speed of the welding nozzle, which may be used as the input of the speed determination model.

In some embodiments, by dividing the movement pattern of welding nozzle into a more specific pattern 1, pattern 2 and pattern 3, and by measuring the degree of plastic deformation of the tension spring, and by inputting the specific pattern and the degree of plastic deformation into the speed determination model, the speed control parameter output by this model is more accurate.

In some embodiments, the speed determination model may be obtained through training a large number of first training samples with a first training label. For example, a plurality of training samples with a training label may be input into the speed determination model. A loss function is constructed through the training label and a prediction result of an initial speed determination model, and the initial speed determination model is updated based on an iteration of the loss function. When the loss function of the initial speed determination model satisfies a preset condition, the training of the speed determination model is completed. The preset condition may be that the loss function converges, a count of iterations reaches a threshold, or the like.

The first training sample includes a sample welding parameter, a sample target transfer form of droplet, and a sample shielding gas composition. The first label may be the speed control parameter. The first label may be marked manually. The first training sample may be obtained based on historical processing data of the welding device. In some embodiments, a plurality of welding experiments may be performed with different speed control parameters under a same set of first training samples, and an actual speed control parameter with the best welding effect is designated as the first label corresponding to the first training sample. A good welding effect refers to a small welding seam, a high welding firmness, a high welding uniformity, no missing welding, etc.

In some embodiments, the speed control parameter is determined through the welding parameter and the target transfer form of droplet to control the rotation speed of the opening-closing motor, thereby controlling the moving speed of the left welding nozzle and the right welding nozzle. This allows the droplet to transfer from the welding rod to the molten pool at a right size and temperature, henceforth achieving an optimum welding effect.

In some embodiments, the welding device further includes a tension spring monitoring device. The tension spring monitoring device may communicatively connect with the processor, and the processor may determine the health score of the tension spring based on length data of the tension spring collected by the tension spring monitoring device.

The tension spring monitoring device is a device used to monitor a plastic deformation of the tension spring, and the length data of the tension spring may be collected through the tension spring monitoring device. The tension spring monitoring device may include a linear displacement sensor, a laser range finder, or the like.

The length data of the tension spring refers to data related to a stretching change of the tension spring. For example, an initial length, a loaded length, and a historical recovery length of the tension spring, etc. The loaded length refers to a longest length formed by stretching the tension spring after loading it with a tension. The historical recovery length is a length of the tension spring after it has rebounded from the loaded length. A historic rebound time is a time for the tension spring rebounding from the loaded length. The historical rebound time may be obtained by the processor, for example, the processor may automatically record a time from when the tension spring is at the loaded length to when it completes a rebound. When the tension spring is no longer stressed and its length remains unchanged over a pre-set time period, it is considered that it has completed the rebound. The pre-set time period may be set according to experience, for example, 5 minutes.

In some embodiments, the tension spring monitoring device may monitor whether the tension spring can recover to its initial length. In some embodiments, the processor prompts to replace the tension spring through an early warning in response to the tension spring not recovering to the initial length. The processor may include an alarm device, and the alarm device may be used to issue an early warning prompt, and the early warning prompt may include one or more of a music prompt, a human voice broadcast, a text display, or the like.

In some embodiments, the processor may calculate a rebound speed of the tension spring based on the historical rebound time and the historical recovery length of the tension spring, and determine the health score of a tension spring 12 by looking up a table based on the rebound speed.

In some embodiments, the processor may determine the health score of the tension spring through a tension spring health determination model based on a tension spring length variation sequence and a temperature sequence.

The tension spring health determination model may be a machine learning model, for example, a recurrent neural network (RNN) model. In some embodiments, an input of the tension spring health determination model may include the tension spring length variation sequence and the temperature sequence, and an output may include the health score of the tension spring.

The tension spring length variation sequence may be a sequence of tension spring lengths obtained through a single stretching and contracting of the tension spring, or a sequence of tension spring lengths obtained through continuous stretching and contracting of the tension spring multiple times.

The temperature sequence may be a sequence composed of temperatures at different time points in history. The temperature sequence may include temperature data, and the temperature data may be obtained by a temperature sensor disposed close to a location of the tension spring, and the temperature sensor may be communicatively connected with the processor, so as to send the temperature data to the processor.

In some embodiments, a count of stretching and contracting of the tension spring is related to the moving speed of the left welding nozzle and the right welding nozzle. For example, the faster the moving speed of the left welding nozzle and the right welding nozzle is, the tension spring may drive the welding nozzle connecting shafts to draw the welding nozzles towards each other, the higher the frequency of an automatic closing of the welding nozzles is, that is, the more count the tension spring stretches and contracts during this process. Therefore, it is helpful to better judge the health score of the tension spring by using the tension spring length variation sequence formed through stretching and contracting for multiple times as the input of the tension spring health determination model.

In some embodiments, the tension spring health determination model may be obtained through training with a large number of second training samples with a second label. The second training sample includes a sample tension spring length variation sequence and a sample temperature sequence. The second label is the health score of the tension spring. The second label may be marked manually.

The second training samples may be obtained based on the historical processing data of the welding device.

In some embodiments, the processor may determine a ratio of a usage time of the tension spring to a standard time as the health score of the tension spring 12 and designate the ratio as the second label. For example, the smaller the ratio of the usage time of the tension spring to the standard time, the shorter the usage time of the tension spring, and the lower the health score of the tension spring. The usage time of the tension spring refers to a time from its usage in the welding device until it fails (being replaced), which may be obtained based on an actual usage time or through artificial experiments on the tension spring at different temperatures. The standard time of the tension spring refers to a normal time from its usage in the welding device until it fails (being replaced), which may be determined by a manufacturer or historical data.

In some embodiments, the processor determines the health score of the tension spring based on the length data of the tension spring collected by the tension spring monitoring device, henceforth accurately obtaining the degree of plastic deformation of the tension spring. This not only facilitates a timely replacement of the tension spring, but also makes the speed control parameter determined by the speed determination model more accurate, and improves the welding effect of the welding device.

In some embodiments, the welding device further includes an image detection device. The processor may determine welding location data and displacement data based on the image detection device; a location adjustment parameter of the welding device is determined based on the welding location data and the displacement data. In some embodiments, the processor may adjust a location of the welding device, and may also adjust an opening-closing distance of welding nozzle between the left welding nozzle and the right welding nozzle by controlling a movement of the welding nozzles. In some embodiments, the welding device may be connected to a mobile slide rail, a mechanical arm, etc., and the processor may communicatively connect with the mobile slide rail, the mechanical arm, etc., so that the processor may control the mobile slide rail, the mechanical arm, etc. to move the welding device.

The image detection device refers to a device used to determine whether a welding displacement occurs during a welding process of the welding device. In some embodiments, the image detection device may include a front camera, a rear camera, and an infrared image monitoring device. The front camera is installed in front of the welding device, and is used to capture an image of an unwelded product that has not yet been welded. The rear camera is installed behind the welding device, and is used to capture an image of a product that has been welded. The infrared image monitoring device is used to capture an infrared image of the unwelded product and the welded product.

In some embodiments, the processor may determine the welding location through image recognition technology or an image recognition model based on the image obtained by the image detection device. The processor may determine whether the welding seam is disposed, whether a welding is missing, etc., and adjust a welding device based thereon.

The welding location data refers to a location where the welding takes place. The displacement data refers to related data that an actual welding location deviates from an original welding location, for example, a displacement distance or the like.

The location adjustment parameter refers to a parameter used to adjust the location of the welding device. For example, the location of the welding device itself, and the opening-closing distance of welding nozzle between the left welding nozzle and the right welding nozzle, etc.

In some embodiments, the processor may determine defect data through a welding defect determination model based on optical image data and infrared image data. The welding defect determination model may be a machine learning model, for example, a recurrent neural network model (RNN) and the like. In some embodiments, an input of the welding defect determination model may include the optical image data and the infrared image data, and an output may include the defect data.

The optical image data refers to data information related to an optical image captured by the front camera and the rear camera. For example, image data of the unwelded product, image data of the welded product, or the like.

The infrared image data refers to data information related to an optical image captured by the infrared image monitoring device. For example, a temperature of each part of the welded product, a temperature of a welding area, an average temperature of the welding product, etc.

The defect data refers to data related to a defect that may exist after the welding product is welded by the welding device. For example, the defect data may include a defect type (the welding displacement, the missing welding, a welding shape defect, etc.) and a location of defect.

In some embodiments, the processor may adjust the welding device based on the defect data output by the welding defect determination model. For example, the location adjustment parameter is generated to adjust the location of the welding device. For example, when the welding displaces, the processor may adjust the location of the welding device according to the defect data (e.g., move up by 5 mm, move left by 3 mm). The above operations ensure that the welding nozzle is opposite to a location where the welding should be performed, thereby solving the problem of displacement.

In some embodiments, the welding defect determination model may be obtained through training a large number of third training samples with a third label. The third training sample includes sample optical image data and sample infrared image data. The third label is actual defect data corresponding to the third training sample. The third label and the third training sample may be obtained based on the historical processing data of the welding device. The third label may be marked manually.

In some embodiments, based on the optical image data and the infrared image data obtained by the image detection device, the processor determines the defect data of the welding product through the welding defect determination model, which can improve the data processing efficiency and obtain more accurate defect data. By determining the location adjustment parameter through the defect data and adjusting the welding device, the welding effect can be further improved and welding defects can be avoided.

The basic concept has been described above, obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "one embodiment" or "an embodiment" or "an alternative embodiment" in different places in the present disclosure do not necessarily refer to the same embodiment. In addition, certain features, structures, or characteristics in one or more embodiments of the present disclosure may be properly combined.

In some embodiments, numbers describing the quantity of components and attributes are used. It should be understood that such numbers used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the present disclosure and claims are approximations that can vary depending on the desired characteristics of individual embodiments. In some embodiments, numerical parameters should take into account the specified significant digits and adopt the general digit reservation method. Although the numerical ranges and parameters used in some embodiments of the present disclosure to confirm the breadth of the range are approximations, in specific embodiments, such numerical values are set as precisely as practicable.

Each patent, patent application, patent application publication, and other material, such as article, book, specification, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A soldering device, comprising:
   a baseboard, on which a left soldering nozzle and a right soldering nozzle are disposed respectively,
   a power shaft,
   a bidirectional moving wheel, and
   two soldering nozzle connecting shafts, wherein the two soldering nozzle connecting shafts are connected to the left soldering nozzle and the right soldering nozzle respectively, and the bidirectional moving wheel which is driven by the power shaft drives the two soldering nozzle connecting shafts to move towards or away from each other;
   wherein the power shaft is rotatably connected to the baseboard; the bidirectional moving wheel is fixed on the power shaft, the bidirectional moving wheel includes two hooking portions, and the two hooking portions are centered on the power shaft in a centrosymmetric structure, the bidirectional moving wheel rotates under an action of the power shaft, the two soldering nozzle connecting shafts are disposed inside the two hooking portions respectively, and at least one soldering nozzle connecting shaft performs a backward separation movement or a mutually approaching movement driven by the two hooking portions when the bidirectional moving wheel rotates; and
   when the bidirectional moving wheel rotates, each soldering nozzle connecting shaft moves along an inner side edge of the corresponding hooking portion and slides to an outer side edge of the corresponding hooking portion, and then enters and moves along an inner side of the other hooking portion, that is, the left soldering nozzle and the right soldering nozzle perform a linear reciprocating action driven by the two hooking portions through the two soldering nozzle connecting shafts.

2. The soldering device according to claim 1, wherein installation positioning holes are disposed on the baseboard corresponding to upper and lower sides of the power shaft, respectively, and positioning pieces are fixed inside the installation positioning holes;
   the power shaft is located on a connection line H formed by the positioning pieces, and the left soldering nozzle and the right soldering nozzle are disposed on two sides of the connection line H respectively;
   the power shaft is also connected to a soldering nozzle sensing film, and the soldering nozzle sensing film moves synchronously with the bidirectional moving wheel; and
   a sensing photoelectric element for sensing the soldering nozzle sensing film is disposed on the baseboard, and the sensing photoelectric element is also disposed on the connection line H.

3. The soldering device according to claim 2, wherein the left soldering nozzle is disposed on a left-side opening-closing plate, the right soldering nozzle is disposed on a right-side opening-closing plate, and the positioning pieces are inserted between the left-side opening-closing plate and the right-side opening-closing plate.

4. The soldering device according to claim 1, wherein an optical shaft is disposed on the baseboard, and the left soldering nozzle and the right soldering nozzle are slidably connected to the optical shaft respectively, so that the left soldering nozzle and the right soldering nozzle perform the linear reciprocating action along the optical shaft driven by the two hooking portions through the two soldering nozzle connecting shafts.

5. The soldering device according to claim 4, wherein the left soldering nozzle is disposed on the left-side opening-closing plate, the right soldering nozzle is disposed on the right-side opening-closing plate, a count of optical shafts is two, and the two optical shafts are disposed in parallel up and down, the left-side opening-closing plate is slidably connected to the two optical shafts, and the right-side opening-closing plate is symmetrical to the left-side opening-closing plate and is slidably connected to the two optical shafts, the left-side opening-closing plate and the right-side opening-closing plate are rotatably connected to the two soldering nozzle connecting shafts respectively.

6. The soldering device according to claim 5, wherein a tension spring is elastically connected between the left-side opening-closing plate and the right-side opening-closing plate, and a stretching direction of the tension spring is axially parallel to the two optical shafts.

7. The soldering device according to claim 2, wherein the soldering nozzle sensing film is in a disc-shaped structure, and the disc-shaped structure includes two plate-shaped bodies in an integral structure and disposed radially symmetrically,
   each plate-shaped body includes three fan-shaped bodies connected in sequence, and the three fan-shaped bodies are disposed concentrically with diameters of R1, R2, and R3 in sequence, wherein R3<R1<R2, and a fan-shaped body is a body in a shape of fan;
   a radius of a rotation path at an outermost end of each hooking portion of the bidirectional moving wheel is R4, wherein R4 equals to R3, and the sensing photoelectric element is disposed on a motion path of the fan-shaped body with a diameter of R3, and senses a photoelectric signal of the fan-shaped body.

8. The soldering device according to claim 1, wherein a radial cross-section of the bidirectional moving wheel is in a shape of S, and the two soldering nozzle connecting shafts are disposed on two sides of the S-shape respectively.

9. The soldering device according to claim 2, wherein the soldering nozzle sensing film is fixed on the power shaft, and a sensing pin is disposed on the soldering nozzle sensing film and the soldering nozzle sensing film is fixed with the bidirectional moving wheel through the sensing pin;
   a positioning wheel is disposed on the power shaft, the positioning wheel has a sensing hole, the sensing pin is inserted inside the sensing hole and a sensing pin positioning hole, and the positioning wheel is fixedly connected to the two hooking portions respectively.

10. The soldering device according to claim 1, wherein the baseboard is disposed with a single-double action fine-adjustment mechanism, and the single-double action fine-adjustment mechanism includes a location-limiting guide block, a single-double action location-limiting block, a single-double action location-limiting slide bar, and a single-double action location-limiting adjustment screw; the location-limiting guide block is disposed between the two soldering nozzle connecting shafts of the left soldering nozzle and the right soldering nozzle; the single-double action location-limiting slide bar is disposed parallel to an axis of the single-double action location-limiting adjustment screw; and the single-double action location-limiting block is fixed on the baseboard, one end of the single-double action location-limiting slide bar is fixed to the location-limiting guide block, and another end is slidably connected to the single-double action location-limiting block along an opening-closing direction of the two soldering nozzle connecting shafts, the single-double action location-limiting adjustment screw is threadedly connected to the single-double action location-limiting block, and one end of the single-double action location-limiting adjustment screw abuts against the location-limiting guide block, the location-limiting guide block drives the soldering nozzle connecting shaft of the left soldering nozzle or the soldering nozzle connecting shaft of the right soldering nozzle to move synchronously when moving along an axial direction of the single-double action location-limiting slide bar.

11. A soldering method for the soldering device according to claim 1, comprising:
    transmitting a solder between the left soldering nozzle and the right soldering nozzle for heating and melting,
    after the solder is fully melted, making the two soldering connecting shafts be driven to move towards or away from each other by the bidirectional moving wheel which is driven by the power shaft,
    making the left soldering nozzle and the right soldering nozzle open and close several times, and
    making a melted solder fall down to solder a product waiting to be soldered.

12. An installation and debugging method for the soldering device according to claim 2, comprising:
    a. taking the connection line H formed by the installation positioning holes as a debugging benchmark, and installing the sensing photoelectric element on the connection line H, so that a sensing center of the sensing photoelectric element coincides with the connection line H;
    b. installing the soldering nozzle sensing film relative to the power shaft, and fixing the bidirectional moving wheel on the power shaft correspondingly; and
    c. rotating the soldering nozzle sensing film until the soldering nozzle sensing film is contacted by a signal of the sensing photoelectric element, recording an original point by the sensing photoelectric element, and setting an opening-closing distance between the left soldering nozzle and the right soldering nozzle by using the original point as a benchmark point.

* * * * *